United States Patent
Scarpa et al.

(10) Patent No.: US 8,630,578 B2
(45) Date of Patent: *Jan. 14, 2014

(54) METHODS AND APPARATUS FOR INTEROPERABLE SATELLITE RADIO RECEIVERS

(75) Inventors: Carl Scarpa, Plainsboro, NJ (US); Edward Schell, Jackson, NJ (US)

(73) Assignee: Sirius XM Radio Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/539,948

(22) Filed: Jul. 2, 2012

(65) Prior Publication Data
US 2013/0059525 A1    Mar. 7, 2013

Related U.S. Application Data

(63) Continuation of application No. 12/080,135, filed on Mar. 31, 2008, now Pat. No. 8,260,192.

(60) Provisional application No. 60/920,894, filed on Mar. 29, 2007.

(51) Int. Cl.
*H04H 20/74*    (2008.01)
*H04K 3/00*     (2006.01)

(52) U.S. Cl.
USPC ................. 455/3.02; 370/208; 714/784

(58) Field of Classification Search
USPC ......... 455/3.02; 370/208, 319, 321, 337, 344, 370/347; 714/784, 786
See application file for complete search history.

(56) References Cited

U.S. PATENT DOCUMENTS

| 8,260,192 B2* | 9/2012 | Scarpa et al. ............. 455/3.02 |
| 2003/0117940 A1 | 6/2003 | Smallcomb |
| 2006/0264191 A1 | 11/2006 | Lai |
| 2007/0053450 A1 | 3/2007 | Walker et al. |

OTHER PUBLICATIONS

International Search Report and Written Opinion of the International Searching Authority, issued for corresponding PCT Application No. PCT/US2008/04241, dated Jul. 8, 2008.

* cited by examiner

*Primary Examiner* — Lee Nguyen
(74) *Attorney, Agent, or Firm* — Kramer Levin Naftalis & Frankel LLP

(57) ABSTRACT

Methods and apparatus are presented to allow one receiver architecture to be used for the reception of two different SDARS signals. Common receiver functions can be utilized to process each signal, thereby obviating the need to duplicate hardware elements. For example, it can be assumed that both signals will not be received at the same time, thus allowing for considerable hardware reuse and lowering the cost of an interoperable receiver.

25 Claims, 12 Drawing Sheets

SIRIUS CONCATENATED DECODING CHAIN

XM CONCATENATED DECODING CHAIN

SIMPLIFIED TDM RECEIVER ARCHITECTURE

SPECTRUM DIAGRAM

SIRIUS TDM FRAME FORMAT

EXEMPLARY XM/SIRIUS COFDM DEMODULATOR

XM TPL CORRELATION ARRIVAL TIME

METHODS AND APPARATUS FOR INTEROPERABLE SATELLITE RADIO RECEIVERS

This application is a continuation of U.S. application Ser. No. 12/080,135 filed Mar. 31, 2008, which claims priority of U.S. Provisional Application No. 60/920,894, filed Mar. 29, 2007, all of which are hereby incorporated by reference in their entirety.

CROSS-REFERENCE TO OTHER APPLICATIONS

This application claims the benefit of and hereby incorporates by reference U.S. Provisional Patent Application No. 60/920,894, entitled "METHODS AND APPARATUS FOR INTEROPERABLE SATELLITE RADIO RECEIVERS" filed on Mar. 29, 2007.

TECHNICAL FIELD

The present invention relates to satellite broadcast communications, and more particularly to systems and methods for an interoperable satellite radio receiver.

BACKGROUND INFORMATION

Currently, there are two licensed satellite radio providers in the United States, XM Satellite Radio Holdings Inc. ("XM") and Sirius Satellite Radio Inc. ("Sirius"), each having a unique transmission format. It has long been desirable for consumers to be able to receive both satellite radio services on one receiver, so that if they would like to change services, no new hardware would need to be purchased. This desire can often occur, for example, when a consumer sells an automobile equipped with a receiver capable of receiving one of the satellite radio services to another consumer who desires to receive the other service. Such an interoperable radio design would need to receive both services utilizing the same hardware. However, due to the many differences between the two systems, this is not as easy as tuning to a different frequency, or even a different band, as can be done on an AM/FM radio. Alternatively, it may be that one day Sirius and XM merge into a combined satellite radio company, and such combined company may desire to keep both formats operating and let a consumer choose which service he or she receives.

It is noted that the simplest approach to an interoperable radio design would be to populate a single circuit design with separate chipsets capable of individually receiving each service. However, this approach can be very costly, would have a large footprint and be an overall inefficient receiver design.

Thus, what is needed in the art is an interoperable satellite radio receiver that intelligently utilize all the commonalities of each system to build the most efficient design in size and power.

SUMMARY

Methods and apparatus are presented to allow one receiver architecture to be used for the reception of two different Satellite Digital Audio Radio Service ("SDARS") signals, such as, for example, one signal from XM Satellite Radio, the other signal from Sirius Satellite Radio. In exemplary embodiments of the present invention common receiver functions can be utilized to process either signal thereby obviating the need to duplicate hardware elements. In exemplary embodiments of the present invention, it can be assumed that both signals will not be received at the same time, thus allowing for considerable hardware reuse and lowering the cost of an interoperable receiver.

It is noted that the patent or application file contains at least one drawing executed in color. Copies of this patent or patent application publication with color drawings will be provided by the U.S. Patent Office upon request and payment of the necessary fees.

DETAILED DESCRIPTION OF THE INVENTION

The present invention relates to methods and apparatus for using one receiver to receive two separate satellite radio broadcasts, such as, for example, both the Sirius Satellite Radio and XM Satellite Radio broadcasts. In what follows, a satellite radio broadcast will be sometimes referred to as being provided by, or related to, a Satellite Digital Audio Radio System ("SDARS"; plural "SDARSs"). Although the following description contemplates exemplary receiver technology to interoperate between the Sirius and XM SDARSs, the methods and apparatus of the present invention are understood as not being limited thereto, and can generally be applied to the receiving and decoding of different digital audio signals by the same device.

An elegant solution to the problem of building a receiver that can receive two separate satellite radio broadcasts would be to design a single chipset that is capable of receiving both services. A fully interoperable chipset would need to intelligently exploit all of the commonalities between the two systems so as to be able to utilize the most efficient design in terms of size and power.

As compared to using two independent radios (chipsets) to achieve XM/Sirius interoperability, a tremendous savings can be achieved by utilizing SDARS receiver elements that are common to each broadcaster's platform. For example, a low cost interoperable receiver can take advantage of the fact that each SDARS system utilizes both QPSK and COFDM modulation.

Detailed information on how individual demodulation functions can be reused for each SDARS signal is provided below in the sections on TDM and COFDM demodulations. First, however, the re-use of external common components, and to a lesser extent, the reuse of common chip based (internal) components, is described according to exemplary embodiments of the present invention. This general scheme is then followed by details of common receiver architecture and processing for each of the TDM and COFDM signals respectively broadcast by the Sirius and XM satellite radio systems.

Figure 1:
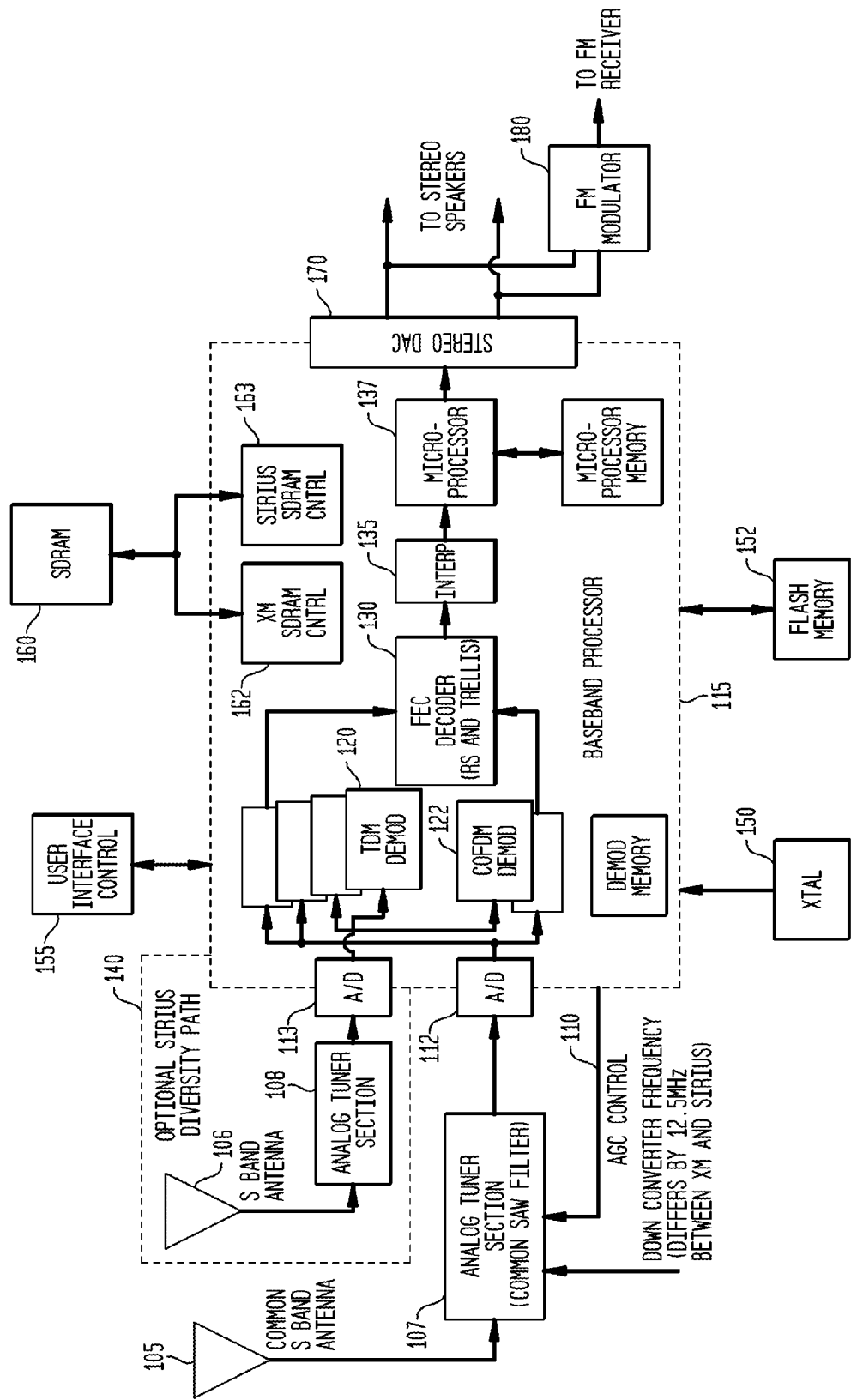
FIG. 1 illustrates a common SDARS receiver block diagram according to an exemplary embodiment of the present invention.

FIG. 1 is a block diagram of an exemplary common SDARS receiver for the reception of both XM and Sirius satellite signals according to an exemplary embodiment of the present invention. In such exemplary embodiment, in order to maximize hardware re-use, it is assumed that only one of the two SDARS signals will be processed at a time.

Each of the Sirius and XM SDARS services transmits a plurality of TDM datastreams and at least one COFDM datastreams (FIG. 5, described below, provides the details of each SDARS service's use of TDM and COFDM datastreams). Moreover, both XM and Sirius utilize circular polarization for their TDM signals and vertical polarization for their COFDM signal(s). Considering that each broadcasts in the S band, differing only by a frequency separation of 12.5 MHz, a first common component that can be re-used is a front end antenna 105 and associated low noise amplifiers. These components do not need to "know" which SDARS signal is being received unless it is desired to utilize front end analog filtering to filter out one of the SDARS signals. In the latter case such a filter would need to be aware of which signal is being processed to avoid attenuating a desirable signal.

Thus, in exemplary embodiments of the present invention, a exemplary receiving antenna's 25 MHz wide signal (or selectable 12.5 MHz wide signal) can, for example, be fed to a front end (analog) tuner 107 and can, for example, be mixed down to a common IF frequency. Such a common IF frequency can be achieved by changing the mix down signal center frequency such that either SDARS signal can be placed at the same IF. By utilizing a common IF, common SAW filters 107 can then, for example, be used for the removal of unwanted adjacent channel interference. In exemplary embodiments of the present invention a common tuner's gain can, for example, be controlled by a feedback signal 110 from the baseband processor.

The data signal can then be applied to a common A/D circuit 112 running at a common oversampling rate. The sampled signal can, for example, feed various TDM demodulators 120 and COFDM demodulators 122. For example, given the broadcast signal details of FIG. 5, an exemplary baseband processor can simultaneously feed an exemplary sampled signal to four TDM demodulators 120 for the XM signal (to avoid long channel change time) and one or more COFDM demodulators 122 (depending upon how the XM COFDM signal is generated, one or two COFDM demodulators may be necessary to demodulate it; if the two segmented band signals are harmonically related, they can, in certain circumstances, be processed using one large FFT).

Figure 5:
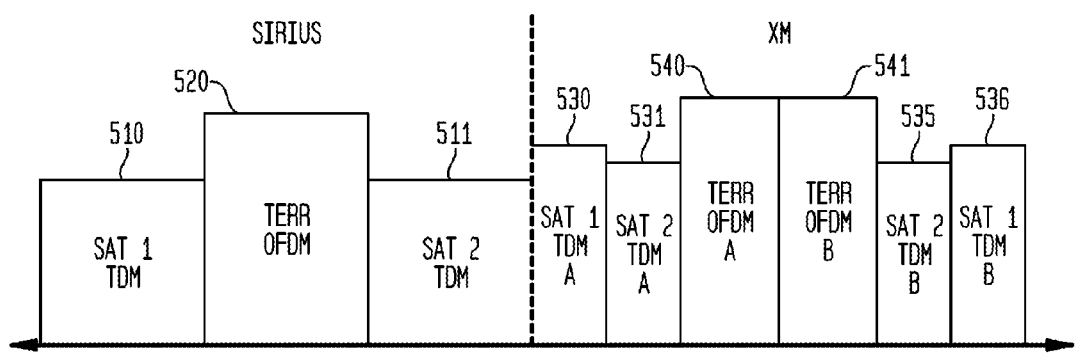
FIG. 5 is a spectrum diagram for the various Sirius and XM signals received by an exemplary receiver according to an exemplary embodiment of the present invention.

Since, as shown in FIG. 5, the Sirius datastream comprises only two TDM signals and only one COFDM signal, the extra two TDM demodulators can be used, for example, for diversity reception when processing the Sirius signal, to provide maximum reception robustness. If a second XM COFDM demodulator is required, it can also be used as a diversity receiver for the Sirius COFDM signal. Exemplary details of diversity signal processing in satellite radio receivers are described, for example, in U.S. patent application Ser. No. 11/607,383, published as U.S. Patent Application Publication No. 20070142009.

It is noted in FIG. 1 that A/D 112 is shown as feeding only two TDM demodulators (the top two) and one COFDM demodulator (the bottom one), and similarly, A/D 113 is shown as feeding the remaining two TDM demodulators (the bottom two) and the remaining COFDM demodulator (the top one). This illustrates an exemplary interoperable receiver processing a Sirius SDARS signal using diversity. If an XM SDARS signal was being processed, A/D 112 would feed all four TDM demodulators, and both COFDM demodulators, as noted above. These connections are not shown in FIG. 1.

Figure 2:
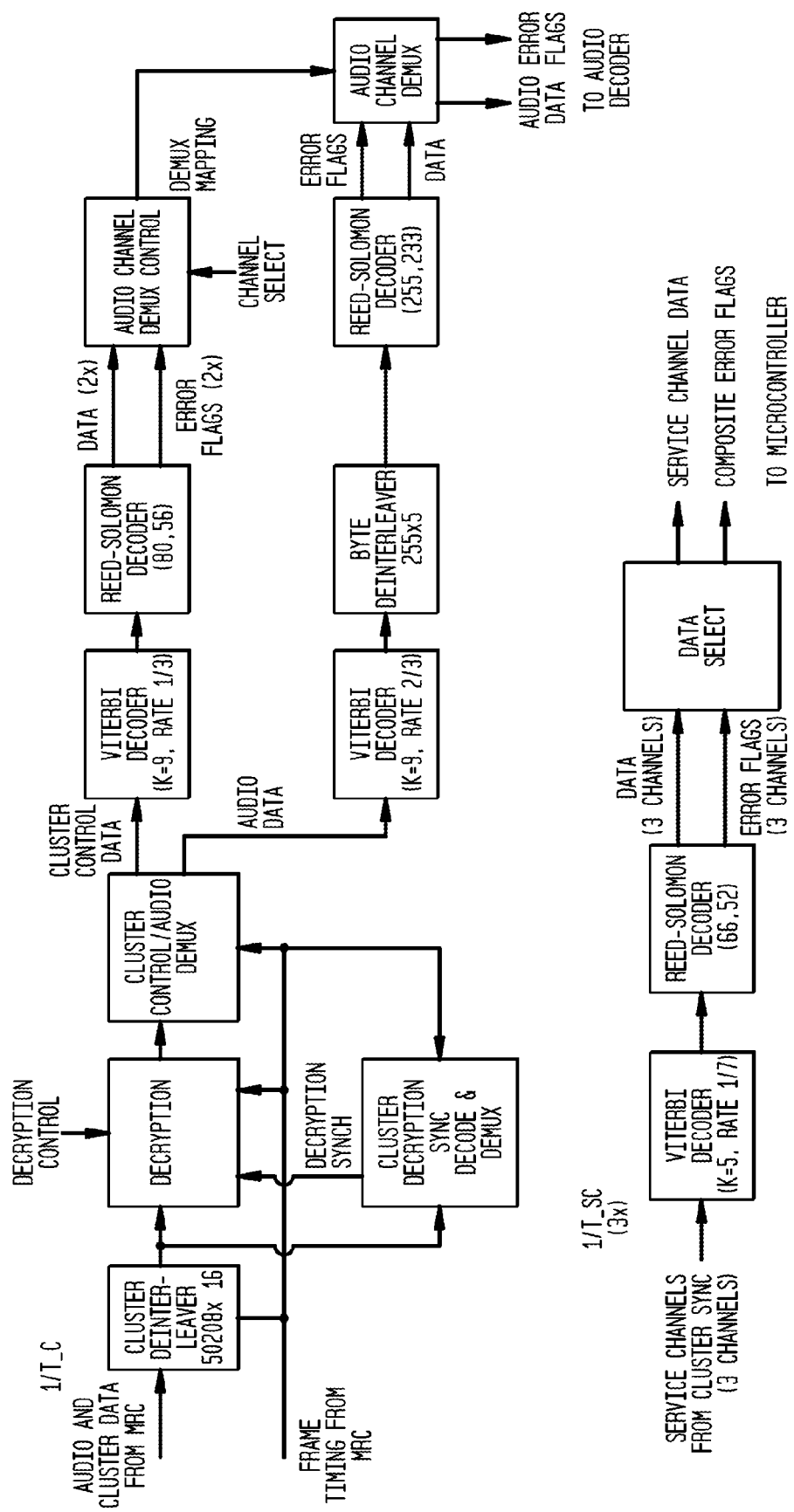
FIG. 2 depicts a Sirius concatenated decoding chain.
Figure 3:
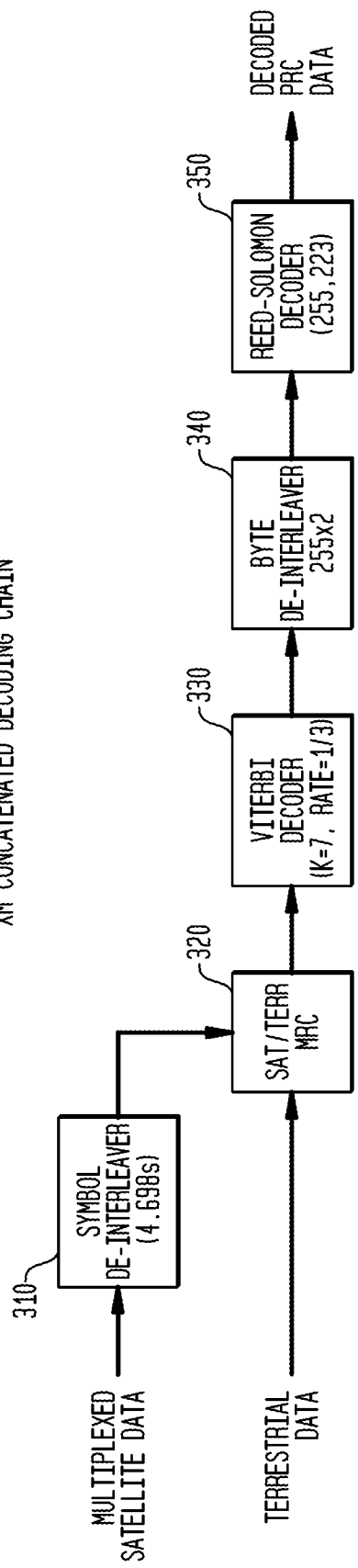
FIG. 3 depicts an XM concatenated decoding chain.

It is noted that once one moves beyond the satellite and terrestrial physical layers, the number of similarities between the XM and Sirius broadcast signals is greatly reduced, making it more difficult to efficiently reuse receiver hardware. While both services employ the use of a concatenated FEC code, with a Reed Solomon (RS) outer code and a convolutional inner code, there are significant differences in the details of their respective FEC coding. XM uses nearly a single coding format across their entire payload, whereas Sirius utilizes three different coding formats in their payload. FIGS. 2 and 3 illustrate the respective concatenated decoding chains of the Sirius and XM datastreams.

Without going into great detail regarding the differences between the two services, a simple inspection of FIGS. 2 and 3 makes it clear that a single re-usable decoding block would not be practical. Nonetheless, there are certain key elements that can be taken advantage of. For example, the main payload in the Sirius stream, i.e., the audio data as shown in FIG. 2, uses a (255,233) Reed Solomon ("RS") code. Similarly, the XM stream also uses a (255,223) RS code with the same primitive polynomial, as shown at 350 in FIG. 3. Due to the multiple coded channels in the Sirius system (e.g., cluster control data, audio data, and service channel data), an exemplary RS decoder (such as, for example FEC Decoder 130 in FIG. 1) can, for example, have a programmable block size for sharing purposes, and can thus be programmed to decode the XM stream as well.

Additionally, each SDARS utilizes byte interleaving of RS encoded data, albeit with different data structures. The XM service uses a simple block based interleaver over two code words, whereas the Sirius service uses a convolutional interleaver on the main audio payload. While the state machine for these two functions will thus differ, the expensive memory that each system requires can be shared. Such shared memory can be, for example, SDRAM 160.

Integration of the convolutional decoding functionality is a bit more complicated. The Sirius SDARS uses three separate Viterbi decoding processes: (i) a highly coded service channel using a rate 1/7 code with a constraint length of 5, and (ii) control and (iii) audio channels each using a constraint length of 9, with respective code rates of 1/3 and 2/3. In contrast, the XM SDARS uses only one base convolutional code of rate 1/3 and constraint length of 7, punctured separately for each of the satellite and terrestrial paths.

Nonetheless, in exemplary embodiments of the present invention, various methods for resource sharing in the Viterbi decoder design can be implemented. One option, for example, is to design a programmable decoder, capable of supporting the rates of both the Sirius and XM datastreams. Another option, for example, is to have separate state machines, but to make full re-use of the memory needed for the trace back. Either approach can yield a measurable savings in overall receiver design.

Continuing with reference to FIG. 1, in exemplary embodiments of the present invention, a baseband chip can, for example, be run by a common crystal 150 at an overclocking rate that is satisfactory for both systems. Additionally, a common user interface 155 can, for example, be used for both platforms, which ca, for example, set the configuration for the tuner and baseband functionalities. Further, an external SDRAM 155 of sufficient size can, for example, be shared for each system. Considering the different SDRAM requirements for each system, two independent SDRAM controller blocks 161, 162 can, for example, be provided for the respective XM and Sirius signals. External flash memory 152 for features such as, for example, song storage, program storage, etc., can be shared across both platforms. One common microprocessor 137 can, for example, be used to control the functionality of the tuner/baseband chip as well as perform audio decoding.

Considering that each system uses different audio encoders (e.g., PAC for Sirius, and AAC for XM) independent audio decompression software can, for example, be loaded in microprocessor 137 for each system's decoding needs. Common stereo DACs 170 can be used for each service, along with a common audio interpolator block 135 (to ensure that audio samples are converted at known sampling rates). The analog audio output of the DAC, regardless of whether it comes from the XM or the Sirius transmission, can also, for example, be sent to a common FM modulator unit 180 for reception on standard FM radios, such as, for example, are found in automobiles. Although shown in FIG. 1 as an external component, such an FM modulator unit can, for example, be incorporated into baseband processor 115 using digital signal processing techniques.

Given an interoperable receiver as described above, further exemplary details of each of TDM signal and COFDM signal interoperable demodulation are next described.

Interoperable TDM Datastream Demodulation

Because both the XM and Sirius services employ QPSK modulation on their satellite paths, this presents one area that can be exploited for reuse in an interoperable receiver design.

Signal transmission using QPSK modulation has been widely practiced for many years, and thus there are well known techniques as to how to implement receiver designs. There are several fundamental signal processing tasks required to properly demodulate a QPSK symbol. However, because most demodulators are designed and optimized with a single transmission format in mind, it is difficult to reuse complete designs to demodulate a different system's signal.

Figure 4:
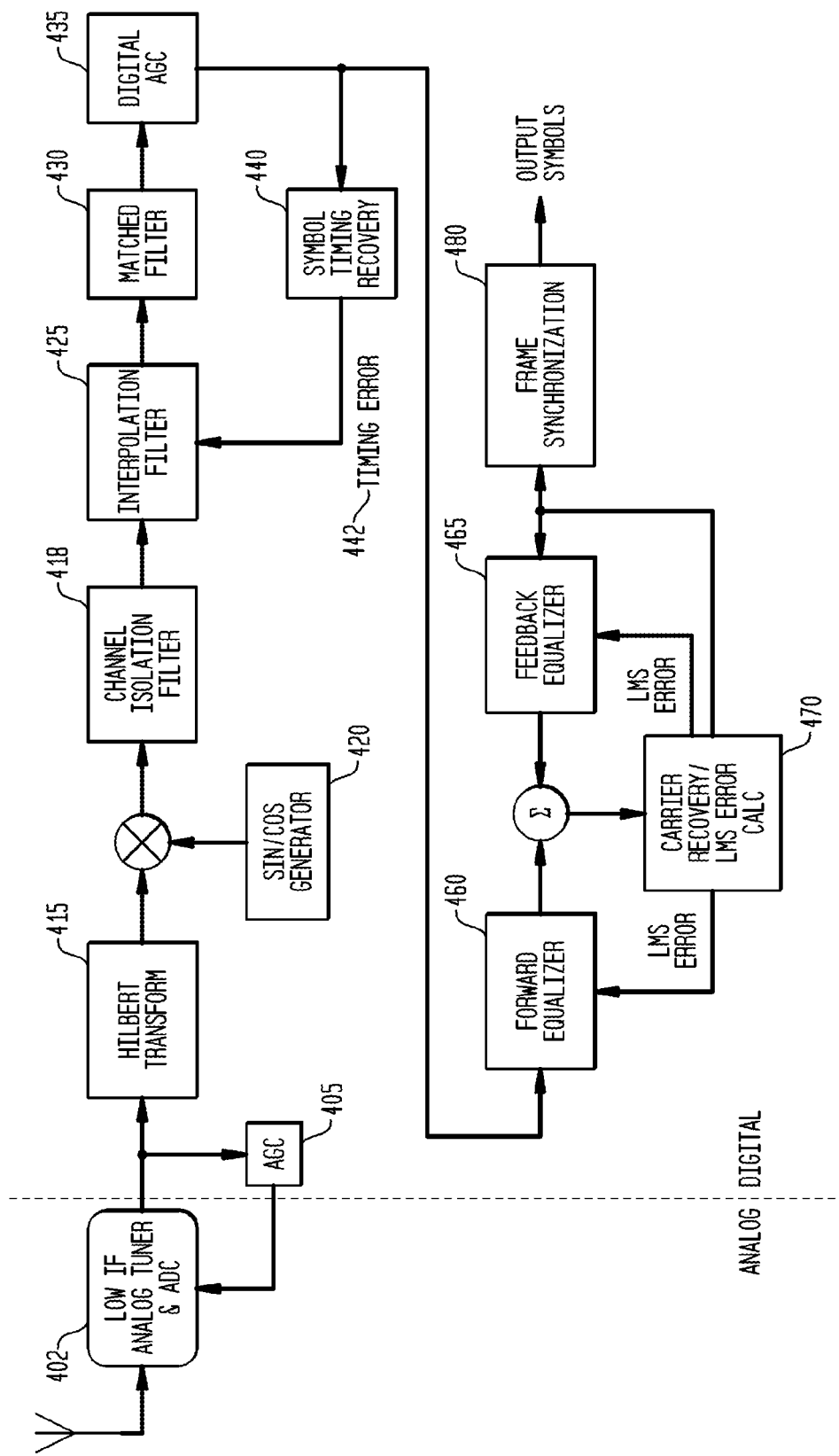
FIG. 4 depicts a simplified TDM receiver architecture according to an exemplary embodiment of the present invention.

FIG. 4 below provides a simplified diagram for an exemplary TDM receiver architecture. It is noted that in FIG. 4 three of the basic building blocks of the architecture are shaded and outlined, namely Channel Isolation Filter 418, Matched Filter 430, and Frame Synchronization 480. These three TDM receiver modules implicate a majority of the required changes to process TDM signals coming from two different satellite systems. The remaining elements of the design would not need to change, provided that some general assumptions hold. In order to clearly describe what changes are required to the aforesaid three modules, it is first necessary to consider the key parameters of the TDM transmission formats of each of the XM and Sirius systems. These are provided in Table 1, below.

TABLE 1

TDM Signal Path Parameters

| Parameter | XM | SIRIUS |
|---|---|---|
| Bit Rate | 3.28 Mbps | 7.5168 Mbps |
| Symbol Rate | 1.64 Msps | 3.7584 Msps |
| Fast Sync Preamble Length | 64 bits | 48 bits |

TABLE 1-continued

TDM Signal Path Parameters

| Parameter | XM | SIRIUS |
|---|---|---|
| Fast Sync Preamble Freq. | 474.5 Hz | 3670 Hz |
| Master Frame Preamble Length | 128 bits (continuous) | 255 bits (spread) |
| Master Frame Duration | 432 ms | 347 ms |
| Padding Field | 192 bits | 0 bits |
| RRC Filter excess BW | 15% | 20% |
| Total Occupied BW | 1.886 MHz | 4.51008 MHz |

The first stage of processing is responsible for recovering the complex baseband signal from the output of the ADC 402. The Automatic Gain Control ("AGC") 405 is intended to keep the signal in range of the ADC. This stage should work identically for both systems, and thus requires no modification for interoperability.

The next step in TDM decoding is to recover the imaginary samples from the real samples using a Hilbert transform 415. The resultant complex signal can then, for example, be shifted down to baseband by a complex mixer, which can also be used for both systems as long as the mixing frequency is programmable.

The first obstacle is thus presented at the Channel Isolation Filter 418, where any adjacent signals are removed. A major difference between the two systems to be accommodated is the occupied bandwidth by each system's TDM streams. Each service utilizes two satellite paths and has an end throughput on the order of 4 Mbps. The Sirius system calls for a single aggregate stream to be transmitted on each satellite, delaying one satellite from the other for time diversity. The entire Sirius content can be thus recovered by demodulating a single data stream. In contrast, the XM system splits their content into two ensembles, and then further splits each coded ensemble into two halves, each with half of the error protection. Thus, each satellite carries half the data from each ensemble, but as two separate QPSK modulated data streams. The bandwidth and symbol rate of each XM TDM stream is thus less than half of that used for a Sirius TDM stream. FIG. 5 illustrates the frequency usage of these two systems. With reference thereto, Sirius has two TDM datastreams 510, 511, each containing the entire Sirius content, one sent from each of two satellites, Sat 1 and Sat 2. XM has four TDM datastreams, 530, 531 and 535, 536. These each contain one half of the XM content, 530 and 535 having the TDM "A" content and 531 and 536 having the TDM "B" content. Each satellite has a TDM "A" and a TDM "B" datastream.

Since the TDM signal bandwidth is not the same for the two SDARS services, a single channel isolation filter 418 may not be appropriate. An efficient filter design will already have variable coefficient multipliers to maximize reuse. For example, said coefficient multipliers can be stored in a table in hardware, or loaded from software. Thus, in exemplary embodiments of the present invention, in order to facilitate switching between two filter responses, two sets of coefficients can, for example, be stored in a ROM table and be selected based upon which SDARS service is then active. The cost of the extra ROM space that this implementation requires is essentially insignificant in the context of the overall design. Such ROM can be, for example, integrated with microprocessor 137, or can be, for example, separate microprocessor memory.

Or, for example, a single filter can be chosen to accommodate both SDARS services, where such a filter has a frequency response that is tuned for the larger bandwidth signal, in this case the Sirius signal. The additional energy passed through on the narrower XM signal, can, for example, be reduced when the matched filter is applied, which would attenuate anything outside the XM signal's bandwidth. A given implementation of these options in a particular receiver is a design choice, and in general better performance is obtained with the former approach, where two sets of co-efficients are stored and utilized.

For the remaining modules, it is important to note that their throughput is dependent upon the symbol rate, and therefore will differ for each system. Any optimizations in hardware, such as, for example, multiplier reuse, must support the faster of the symbol rates, which between the XM and Sirius signals, is that of the Sirius SDARS.

The next stage of processing is to recover the 2× rate data symbols. The first step in this process is to interpolate the samples to the proper symbol rate. The exact choice of Interpolation Filter 425 is a design choice, subject to the requirement that it be capable of supporting both symbol rates, as listed in Table 1. In exemplary embodiments of the present invention this can be accomplished by having a programmable NCO update rate. After interpolation, a matched filter 430 must be applied, such filter being responsible for maximizing the SNR of the received signal. As provided in Table 1, the XM and Sirius systems each use different coefficients for their matched filter design. Depending on acceptable performance levels, this can be accommodated in two different ways. As noted above, a simple approach is, for example, to use a single matched filter design, which can be optimized one way or the other towards a particular service, or designed to split the difference between the two, not being truly optimized for either. Either way, there will be some performance degradation to one or both systems. To maximize performance, however, another choice can be, for example, to have two sets of filter coefficients stored in hardware. The filter can choose the appropriate set of coefficients based on which system is then active. As with Channel Isolation Filter 418, an efficient matched filter design can also utilize variable coefficient multipliers to maximize reuse. In such an embodiment the additional cost of implementing both filters is the cost of the additional ROM space to store the second set of coefficients.

Following Matched Filter 430, a digital AGC 435 can be used to set the isolated signal to a normalized level. This can compensate for signal strength variation due to, for example, fading. With programmable parameters, such a module should work equally well for both systems. The digitally AGC'd signal can then be used for symbol timing recovery 440. There are several techniques to recover symbol timing information from a QPSK signal. Regardless of algorithm choice, there should be no difference between the two systems, since both are QPSK signals. Symbol Timing Recovery 440 works in conjunction with Interpolation Filter 425, driving the final interpolation rate using an error signal (shown as Timing Error 442 in FIG. 4). Parallel to the timing recovery is the recovery of the 1× rate data symbols. Continuing with reference to FIG. 4, this latter process consists of the combined functions of a fractionally spaced Forward Equalizer 460, a decision directed Feedback Equalizer 465, and Carrier Recovery 470. Beyond the assumption of some programmability to the loop gains of these modules, there should be no difference in usage for both SDARS systems.

The final stage in the demodulation process is synchronization. This functionality is where the heart of the differences between the two SDARS systems lies. In the description thus far, only the two similar QPSK modulated streams at different symbol rates have been considered, and not the underlying structure of the data. To better illustrate these differences, FIGS. 6 and 7 below detail the respective structures of the transport stream for each SDARS service.

The key parameter differences, such as frame duration and preamble lengths, are outlined in Table 1 above. XM has a 128 bit continuous preamble, and its master frame has a period of 432 ms. Sirius has a 255 bit preamble spread throughout its master frame, and its master frame has a period of 347 ms. The first task in synchronization is to lock onto the Fast Synchronization Preamble (FSP) contained in a datastream. A common technique for accomplishing such lock-on is to perform a cross-correlation of the incoming signal with the known preamble sequence. The output of the correlation can, for example, then be used to mark the start of the data portion, as well as to correct any ambiguity in the received quadrant location. The details of such a correlation function are well known, and thus omitted here so as not to complicate the description. As seen in Table 1, both the XM and Sirius master frames employ the use of an FSP, and both are completely periodic in the transmitted waveform. However, as noted, the length and repetition of the FSP differ between the two systems. To accommodate this within a single design, the correlation can be fixed to the length of the longer sequence (i.e., XM's) and the reference sequence can, for example, be selectable, depending on which service is active. Since the FSP for Sirius is shorter, the Sirius reference stored in hardware can, for example, be zero padded to limit the contribution to the correlation output to only the symbols of interest, but still meet the now fixed longer sequence length. In exemplary embodiments of the present invention, an FSP reference can also be used, for example, to determine an SNR estimate. Thus, in exemplary embodiments of the present invention, with a minimal amount of programmability, a single hardware block can thus be used to determine synchronization lock, quadrant correction, and SNR estimation.

Figure 6:
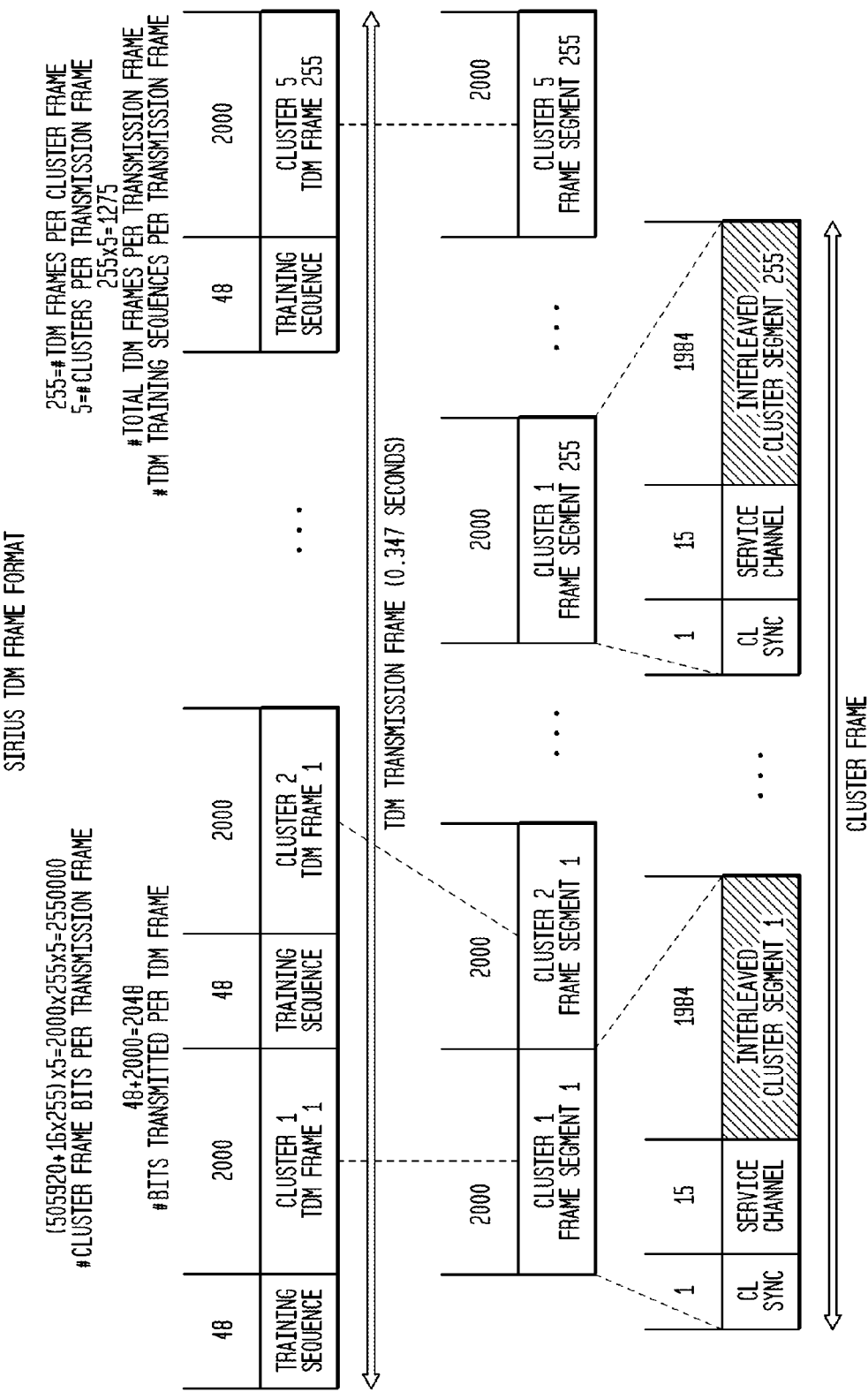
FIG. 6 illustrates a Sirius TDM frame format.
Figure 7:
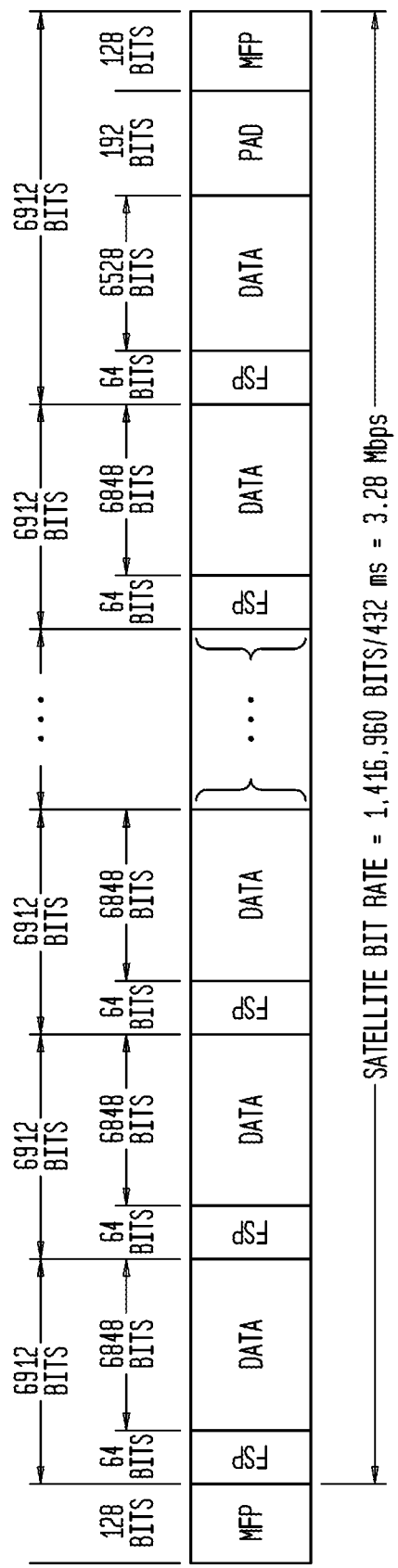
FIG. 7 illustrates an XM TDM frame format.

In order to properly recover the data in each datastream, a second layer of synchronization can be used to obtain a reference to the master frame boundary. Master frame synchronization is required to align signals from the different satellite and terrestrial paths for proper combining, as well as to initialize FEC and demultiplexing functionalities further along in the receive process. As shown in FIG. 5, the Sirius broadcast has two satellite signals and one terrestrial path, and the XM broadcast has four satellite signals and two terrestrial paths. Sirius and XM deploy two completely unique approaches to master frame synchronization. Sirius uses a 255 bit pseudo-random sequence which is repeated five times and spread throughout the entire master frame interval by dedicating one bit following each FSP to cluster synchronization. This is shown in FIG. 6, which depicts the Sirius TDM frame format. The Sirius TDM datastream comprises 1275 TDM frames, being five clusters each having 255 TDM frames. Each TDM frame is preceded by a 48 bit FSP (labeled "training sequence" in FIG. 6). Thus, as shown in FIG. 6, the TDM Transmission Frame runs from Cluster 1, TDM Frame 1 through Cluster 5, TDM Frame 255, for a total of 1275 TDM frames per transmission frame. Each TDM frame has a single Cluster Sync bit, and thus each cluster contains the 255 bit pseudo-random sequence, which is repeated in each of the five clusters.

On the other hand, XM concentrates its synchronization sequence into a sequential series of data, occupying the tail end of the 6848 bits following an FSP, occurring only once every 432 ms. This XM synchronization sequence is shown as the 192 bit "PAD" sequence at the end of the master frame in FIG. 7 (second to last field on right). Thus, the exact technique to synchronize these two signals cannot be similar and requires separate sections of hardware logic. In exemplary embodiments of the present invention the appropriate hardware can be switched into the data path, depending on which service is active. Such master frame synchronization represents the final step in demodulating the TDM data stream, as is shown in FIG. 4. Such hardware can be, for example, a correlator circuit.

The above description covers how to implement a single TDM demodulator to properly recover both XM and Sirius data from their respective SDARS streams. The disclosed technology exploits all the similarities of the two services, while intelligently managing the differences between them, resulting in a highly efficient, low cost solution for an interoperable TDM receiver architecture. The disclosed technology can, for example, be included in a fully interoperable satellite radio receiver chipset design, such as that of FIG. 1.

Interoperable COFDM Datastream Demodulation

Next described is a method to allow a single COFDM receiver architecture to be used for the reception of two different COFDM signals, such as, for example, one from an XM satellite radio and the other from a Sirius satellite radio, by using identical processing blocks to achieve all required synchronization. The disclosed method avoids the need for using two independent FFT engines in the XM system provided that the two COFDM signals are properly spaced in frequency.

Figure 8:
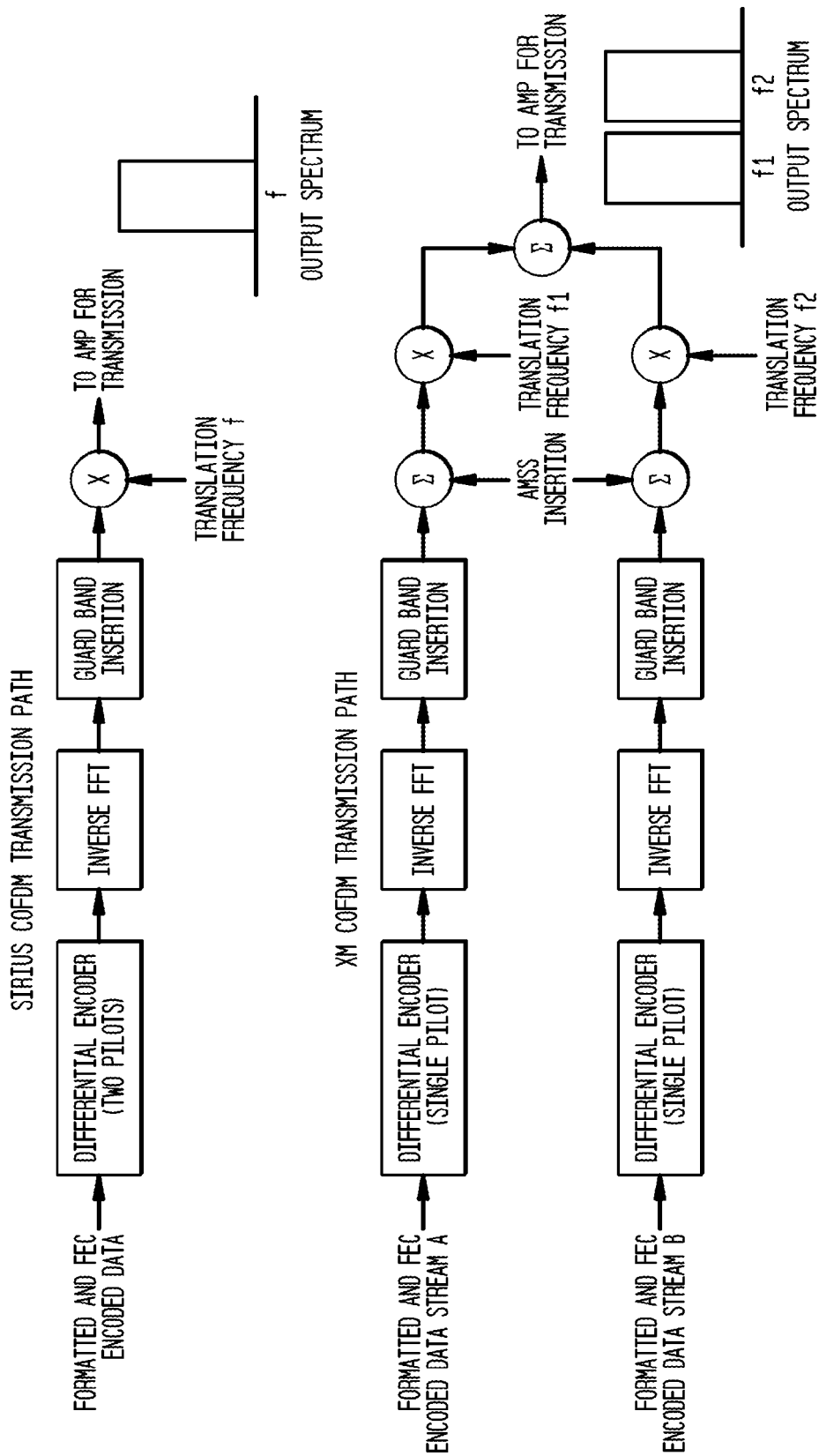
FIG. 8 illustrates the XM and Sirius COFDM transmission paths.

To better appreciate the value of this method, the respective structures of the XM and Sirius COFDM waveforms need to be appreciated. FIG. 8 depicts an overview of each of the Sirius and XM COFDM datastreams. As can be seen therein, Sirius uses a conventional system design of consecutive FFT symbols to transmit data. In the Sirius system, the formatted and FEC encoded data is first differentially encoded across 1000 FFT data bins, with 2 bins used for reference pilots. No other bins are used, and thus all other bins are set to zero (including the DC bin). The data undergoes an inverse FFT and a cyclic guard band is inserted for multi-path immunity. The time waveform is then frequency translated and sent to a power amplifier for transmission. The Sirius approach is a standard method for generating COFDM waveforms.

As also seen in FIG. 8, the XM approach is similar to Sirius' approach, with the exception of two minor differences. First, the XM data is segmented into two independent streams, Stream A and Stream B, corresponding to ensembles A and B described above, and second, the final time domain output (prior to frequency translation) is concatenated with an Amplitude Modulated Synchronization Signal (AMSS) every 7.2 milliseconds. This short waveform, inserted every 60 FFT symbols and lasting for approximately 61 microseconds, is used to assist an XM receiver in performing various synchronization functions. After each XM stream is frequency translated, as shown in FIG. 8, they are effectively summed and sent to a power amplifier for transmission. XM's usage of the AMSS signal for various synchronization functions has caused its COFDM receiver design to significantly vary from that commonly used in Sirius receivers. In exemplary embodiments of the present invention, this need not be the case, and all methods used to decode the Sirius COFDM signal can also be applied to the XM COFDM signal, thus resulting in interoperability of a COFDM receiver across the two SDARS formats. Using the same processing for these two signals naturally leads to a smaller receiver design that can work with either system in an interoperable receiver. Additionally, avoiding the usage of the XM AMSS signal can, for example, lead to improved performance. This is because the AMSS signal is not immune to multi-path distortion (as is the case for normal COFDM symbols as a result of the guard band time interval).

Accordingly, what is next described is (i) how each of the synchronization functions are performed in the Sirius COFDM receiver and then how this functionality can also be used with respect to the XM system; (ii) how in all cases the XM AMSS need not be used, and thus an identical receiver can be used to process both COFDM signals; and (iii) how, if the two XM ensemble streams are translated to a correct offset, one large FFT can be used to perform demodulation of both XM COFDM ensembles.

Figure 9:
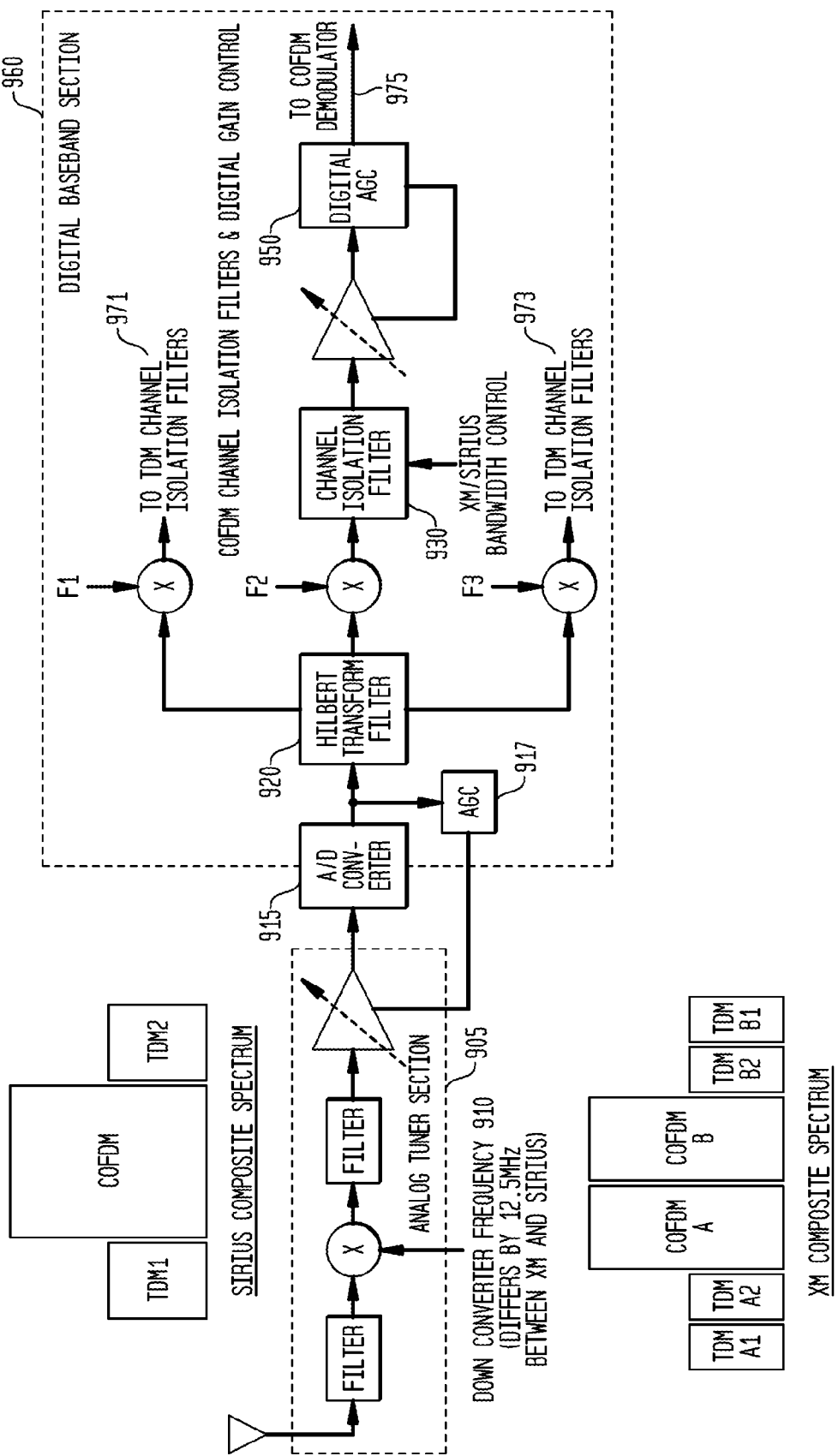
FIG. 9 illustrates exemplary COFDM front end processing according to an exemplary embodiment of the present invention.

A first task in processing either the XM or the Sirius COFDM signal is to isolate the COFDM signal from the TDM signals. To do this correctly, and not cause A/D clipping distortion, this signal must also be under AGC control. These functions can be performed, for example, via an exemplary front end design as shown in FIG. 9. With reference thereto, in exemplary embodiments of the present invention, a common tuner, for example Analog Tuner section 905, can be used for the two systems, isolating the 12.5 MHz signal via a selectable downconversion frequency 910. The signals can then be digitized in A/D converter 915 and a blind AGC algorithm can be used, for example, to control the composite signal level being digitized via AGC 917. A blind AGC algorithm being one that is based on the signal power, and that is not at all cognizant of the waveform structure. The signal can then be converted to a complex waveform via a Hilbert transform filter 920. It is noted that although this description assumes real sampling (single A/D converter 915), the same concepts can be applied to complex sampling, which can be performed with a second A/D, for example (and thus bypass the need for a Hilbert transform filter). The composite complex signal can then, for example, be mixed to baseband based on its original center frequency.

In FIG. 9, "F1" "F2" and "F3" in FIG. 9 are the original center frequencies. Thus, the same signal is output three times from the Hilbert Transform Filter and then mixed with F1, F2 and F3.

Three output branches are shown (at the right side of FIG. 9), indicating that the signal can be subsequently processed by circuits dedicated to COFDM processing and TDM processing, as described above.

In FIG. 9, the COFDM output path is shown in more detail, revealing that the COFDM signal (either the two adjacent XM COFDM signals or the single Sirius COFDM signal, as described above) can, for example, then be isolated from the TDM signals by a low pass filter (Channel Isolation Filter 930, for example). The signal can then, for example, be internally adjusted to the correct level via a second blind AGC (not data aided) control block 950.

It is noted that in the schema of FIG. 1, the front end processing shown in FIG. 9 would be performed within the BaseBand Processor 115 between the output of A/D 112 (and A/D 113, if used), and the input to TDM Demod(s) 120 and COFDM Demod(s) 122. The Analog Tuner section 107 of FIG. 1 corresponds to the Analog Tuner section 905 of FIG. 9, the latter providing more detail.

In exemplary embodiments of the present invention, a channel isolation filter, such as Channel Isolation Filter 930, can remove as much adjacent signal power as possible. Since the bandwidth of each of the respective Sirius and XM COFDM signals is different (i.e., ~4 vs. ~5 MHz, respectively), an interoperable channel isolation filter needs to be told which signal is being processed at any given time. The bandwidth of the filter can be changed, for example, by loading different filter tap coefficients or, for example, by splitting the filter into two parts, where one stage is used for XM (or Sirius) filtering and the other parallel filter is only used as a correction factor to achieve a different filter bandwidth when the complement signal is processed.

Figure 10:
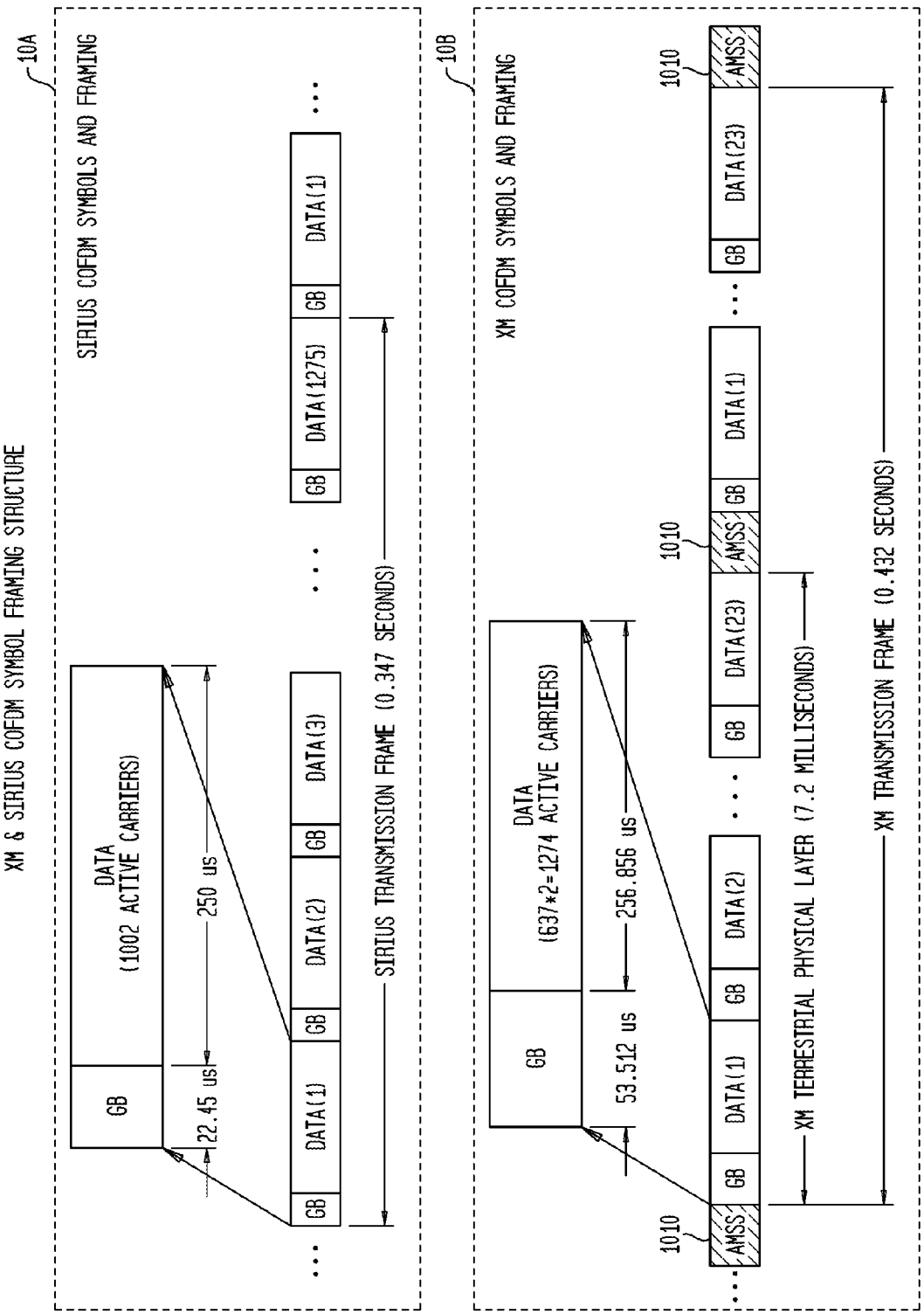
FIG. 10 illustrates Sirius and XM COFDM symbol framing structures.

For clarity of description, the exact COFDM signal structure for each of the two systems is outlined in FIG. 10. FIG. 10A, the upper frame, shows the time duration of a single Sirius COFDM symbol (including guard band time) along with a collection of COFDM symbols to form a master frame. The XM COFDM structure, shown in FIG. 10B, the lower frame, is very similar to Sirius' except for the periodic insertion of the AMSS 1010 every 7.2 milliseconds, which is shaded in FIG. 10B for ease of identification.

In exemplary embodiments of the present invention, in order to utilize as much common hardware as possible for the processing of both signals, a 2048 point FFT can, for example, be used as the fundamental FFT demodulating engine. In the Sirius system, a total of 1002 active bins will be occupied and in the XM system a total of 1274 active bins will be occupied (hence calling for a common 2048 FFT engine). However, to insure that the sampling rate of the FFT engine yields orthogonal FFT bins for a given signal of interest, the sampling rate for the FFT needs to be different for each of the two SDARS signals. In the Sirius system, a sampling rate of the reciprocal of one COFDM symbol yields a sampling rate of 8,192,137.5 Hz. This sampling rate yields exactly 2048 samples during the COFDM symbol that contains data and 184 samples for the guard band time. The FFT bin spacing (with respect to the FFT) is 4 KHz.

The symbol duration of each XM COFDM ensemble is exactly 310.368 microseconds. This yields a required sampling rate of 7,974,405.577 Hz to also have 2048 data samples during the data portion of the XM COFDM signal and 427 samples during the guard band. This yields a FFT bin spacing of 3.8932 KHz.

At this point it is noted that because the two XM ensembles differ in frequency, there is no overlap in the frequency domain. Thus, the frequency spacing between the two ensembles must be a multiple of the FFT bin spacing (3.8932 KHz) to ensure that each stream does not create inter-carrier interference (or else the streams will not be orthogonal to each other based on the sample rate provided above). If the two streams are not generated in such a manner, doing so is fairly simple by using a single FFT to generate both streams. Receivers should see no difference other than a small offset from what they currently can expect (maximum offset can be up to 3.893/2 KHz).

Additionally, it is assumed that the AMSS insertion for each of the two ensembles is synchronized in time. This assures that each ensemble COFDM symbol will be bounded within the same guard band time interval. If this is not the current case, it can be assured by once again using the same FFT to generate the two COFDM ensemble symbols.

If, for example, either the correct frequency relationship or AMSS synchronization is not performed, then two independent COFDM demodulators for the XM signal will need to be used. However, even in that case all concepts of using the same synchronization circuits (as explained below) for both COFDM signals can still apply. In such a scenario one demodulator can, for example, be used while processing a first XM COFDM ensemble and a second, identical COFDM demodulator can, for example, be used for processing the second XM COFDM ensemble.

Noting that one large FFT engine can be used to demodulate both COFDM signals (with correct initial sampling rates), what is next described is how a single receiver structure can handle both signals for all other required signal processing functions.

Figure 11:
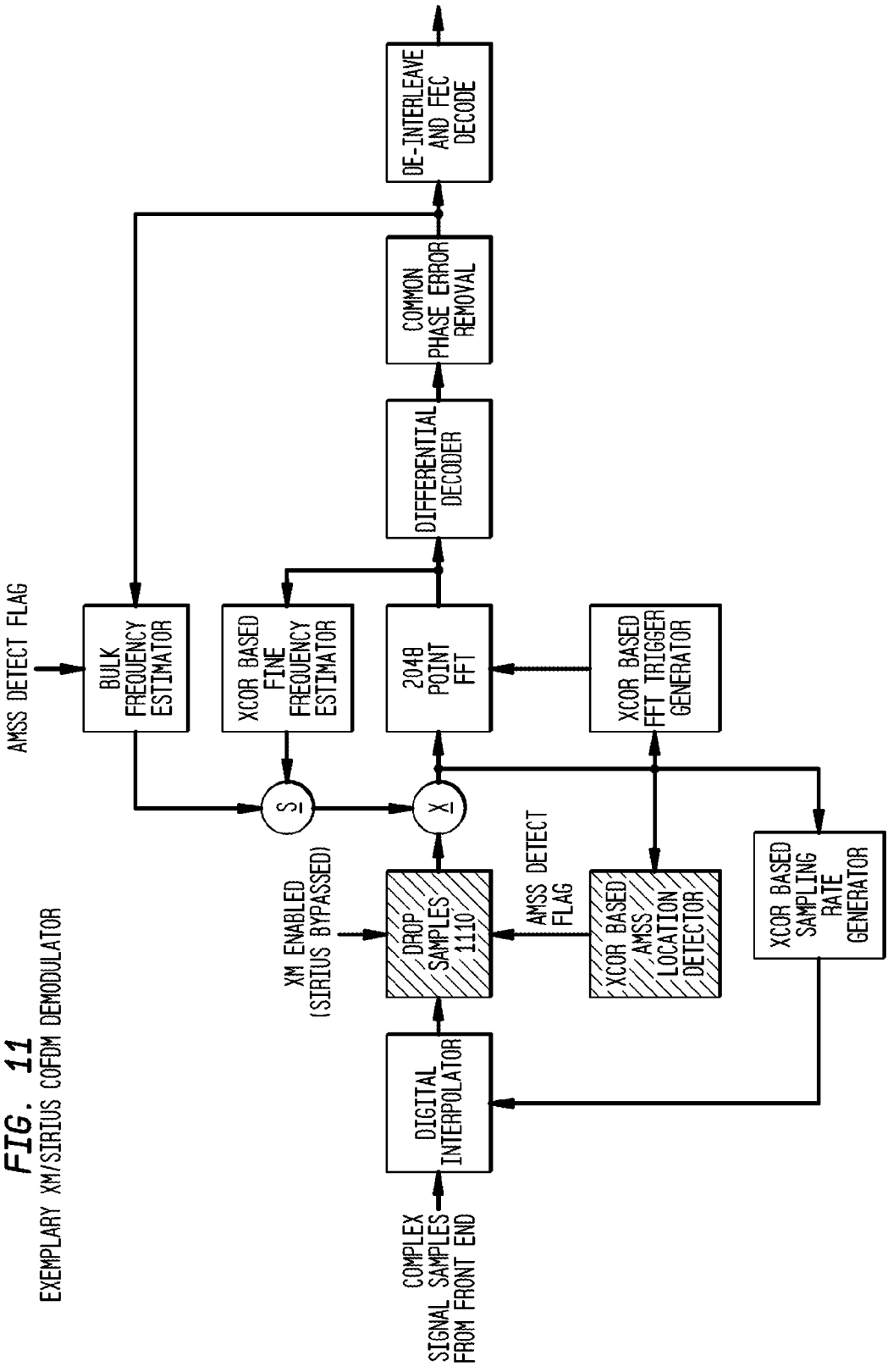
FIG. 11 illustrates an exemplary COFDM demodulator according to an exemplary embodiment of the present invention.

FIG. 11 is an exemplary overall block diagram of such an interoperable COFDM receiver. The complex samples from the common front end block can, for example, first be applied to a digital resampling circuit. Since the front-end (A/D and filters) will run at the same rate for both COFDM signals, the function of the digital re-sampler can be, for example, to drop the initial A/D sampling rate to one that is synchronous so that exactly 2048 samples are taken during the COFDM data portion. Since the required sampling rates are different, the ratio of the initial common front end sampling rate to the final synchronous sampling rate will be different for each of the XM and Sirius COFDM signals. The initial sampling rate can normally be set, for example, by an initial register value.

Figure 12:
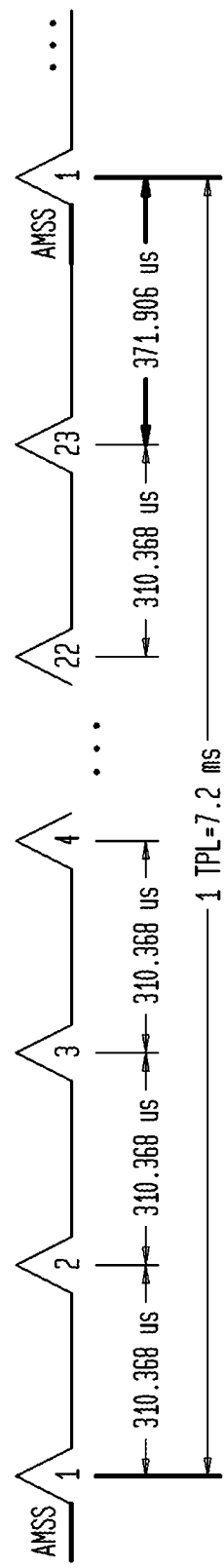
FIG. 12 illustrates XM TPL arrival time.

Since the Sirius system does not contain an AMSS signal, to use a common receiver design that can process both signals, one must drop these samples from additional processing while demodulating the XM signal. This function can be performed by the drop samples block 1110 in FIG. 11 (shown in green shading with cross-hatching). At the XM post interpolator sampling rate of 7.974 MHz, and an AMSS time duration of 61.5 microseconds, this corresponds to dropping approximately 491 samples every 7.2 milliseconds. The determination of where in the time domain sample stream the AMSS is located can be performed, for example, by the AMSS location detector. It is noted that this detector is not based on the structure of the AMSS signal. The AMSS detector is based on the fact that the standard cross correlation functions used in COFDM receivers will experience a gap every 23 FFT symbols. The detector thus works by measuring the average time between consecutive guard band correlation peaks and detects when a peak occurs not at the nominal spacing. During each XM TPL (i.e., Terrestrial Physical Layer frame, as shown in FIG. 10B) the guard band correlation peaks will occur every 310.368 microseconds. At the location of the AMSS, the next correlation peak will occur at {310.368+61.538} microseconds later. This process will repeat itself every 23 FFT symbols. The detector circuit can perform, for example, a synchronous average over groups of 23 FFT symbols, and after sufficient averaging is performed, the AMSS location can be detected by noting the gap in time of peak arrivals. Such correlation peak arrival times are shown in FIG. 12. It is noted that detection of the AMSS is not dependent on obtaining carrier lock, proper FFT trigger timing or sampling rate timing, inasmuch as it is not needed for correlation. This fact allows, for example, the AMSS to be detected well before any other processing loop has achieved lock.

In exemplary embodiments of the present invention, with the AMSS samples dropped from additional processing, the COFDM demodulator only has to process data samples that contain the FFT data and guard band. Although all of the recovery blocks will work in parallel, for ease of illustration the following description of how each block is achieved will be explained from left to right (with reference to FIG. 11). It is understood that this is not in any sense a required order to successfully process a COFDM signal.

The sampling rate clock can be adjusted, for example, by noting the drift between correlation peaks. If the receiver is not synchronously sampling the received signal, the spacing between each peak will slowly increase or decrease (depending on whether the clock is respectively sampling too fast or slow) the number of samples between correlation peaks. The peak location will move as a function of time, and it is this motion that can be applied to a PLL circuit, for example, to stop the peak location difference from changing. This is a standard known technique in OFDM receiver design.

The correct location of the FFT trigger, that is, determining which data samples to apply to the FFT engine, can, for example, be determined by collecting 2048 samples after each correlation peak. This is another standard technique in OFDM receiver design.

The correction of carrier offset can be done, for example, in two parts, i.e., in each of a fine and a coarse correction phase. The fine frequency correction can be performed, for example, by applying the quadrature component output of the correlation function into a PLL. Once the quadrature component has been driven to zero (or close to it) it has achieved FFT orthogonality. At this point all data in the FFT bins are orthogonal to each other, avoiding inter carrier interference. This is a standard known technique in OFDM receiver design as well.

Once FFT bin orthogonality has been achieved, the last step to achieve full carrier recovery is to adjust for gross (bulk) frequency offset. Recalling that all FFT data bins are orthogonal but not guaranteed to be in the their correct bins, to detect for gross bin offsets the known 128 bit differentially encoded master frame preamble (MFP) can be used, for example, for the XM signal and the cluster sync signal can be, for example, used for the Sirius signal. Both of these signals are known patterns and can be expected to be found in predetermined bin locations. If detection is found in any bin but the correct one, this is the bulk frequency offset that needs to be applied to the down mixing signal (which will always be a multiple of the FFT bins spacing). In the XM signal the MFP occurs every 0.432 Milliseconds and is always after an AMSS. Thus, in exemplary embodiments of the present invention The AMSS detection flag can be used, for example, to narrow the search for this pattern rather that being performed on every FFT symbol. In the Sirius system, the cluster sync is time distributed over the entire frame duration, one bit in one bin per FFT symbol. In each case, the pattern can be detected after the differential decoder and common phase error remover. Detecting known patterns are standard techniques for receiver design and can be implemented using known techniques. The combined fine and coarse frequency estimates are added together and form the overall mixing frequency to down convert the COFDM signal to baseband.

At this point in the processing, for each of the XM and Sirius COFDM signals, all synchronization tasks have been achieved—i.e., AGC, sampling clock, FFT trigger and carrier recovery. It is noted that all required processing can be achieved using one common receiver structure. The data can next be handed off to the de-interleaver and FEC decoder blocks which are different between XM and Sirius.

While the present invention has been described with reference to certain exemplary embodiments, it will be understood by those skilled in the art that various changes may be made and equivalents may be substituted without departing from the scope of the invention. For example, the methods of the present invention may be used in any receiver that seeks to interoperate with two different broadcast signals having coding and modulation formats that are disparate in some ways and similar in others. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A satellite radio receiver capable of receiving broadcasts from different satellite radio services, comprising:
   a common S-band antenna and analog tuner;
   a common A/D converter;
   partially shared TDM signal processing, said shared TDM signal processing including at least one of:
      (i) storing two sets of channel isolation filtering coefficients in a ROM table and selected based upon which satellite service is then active; and
      utilizing a single channel isolation filter to accommodate both satellite services, tuned to the service with larger TDM bandwidth, and
      (ii) storing two sets of matched filter coefficients in hardware and selected based upon which satellite service is then active; and
      utilizing a single matched filter to accommodate both satellite services, tuned either to one of the satellite services or designed to split the difference between the two;
   and partially shared COFDM processing;
   wherein a common microprocessor is used to control tuner/baseband chip functionality and to perform audio decoding.

2. The receiver of claim 1, wherein the two SDARS signals are those broadcast by Sirius Satellite Radio and XM Satellite Radio.

3. The receiver of claim 2, wherein all methods used to decode the Sirius COFDM signal can also be applied to the XM COFDM signal, thus resulting in interoperability of a COFDM receiver across the two SDARS formats.

4. The receiver of claim 2, wherein said partially shared COFDM signal processing is performed without using the XM AMSS signal.

5. The receiver of claim 2, said XM service comprising two COFDM ensembles, wherein: each of the synchronization functions performed in the Sirius COFDM receiver can also be used with respect to the XM system; the XM AMSS need not be used, and thus an identical receiver can be used to process both COFDM signals; and the two XM ensemble streams are translated to a correct offset, and one large FFT is used to perform demodulation of both XM COFDM ensembles.

6. The receiver of claim 1, further comprising a second S-band antenna and analog tuner.

7. The receiver of claim 6, wherein the second S-band antenna and analog tuner can be utilized as an optional diversity path.

8. The receiver of claim 1, wherein each satellite signal is first fed to a front end tuner, is then mixed down to a common IF frequency, and is then filtered by a common SAW filter.

9. The receiver of claim 1, further comprising four TDM demodulators, wherein all four are used for demodulating a TDM signal from a first SDARS transmission, and two of are used for demodulating a TDM signal from a second SOARS transmission.

10. The receiver of claim 9, wherein the first SDARS transmission is an XM transmission and wherein the second SDARS transmission is a Sirius transmission.

11. The receiver of claim 10, wherein when receiving a Sirius SDARS transmission the remaining two TDM demodulators can be used as a diversity receiver.

12. The receiver of claim 1, further comprising a COFDM demodulator for demodulating a COFDM signal from a first SDARS transmission and one COFDM demodulator for demodulating a COFDM signal from a second SDARS transmission.

13. The receiver of claim 12, wherein when receiving a Sirius SDARS transmission one of the two COFDM demodulators can be used as a diversity receiver.

14. The receiver of claim 1, further comprising a common RS decoder with programmable block size.

15. The receiver of claim 1, further comprising a common programmable convolutional decoder, arranged to support the rates of each satellite service's transmission(s).

16. The receiver of claim 1, further comprising at least one of:
- a baseband chip run by a common crystal, at an overclocking rate that is satisfactory for both satellite systems;
- a common external SDRAM; and
- common shared external flash memory.

17. The receiver of claim 1, wherein the microprocessor is loaded with independent audio decompression software sufficient to decode each satellite transmission.

18. The receiver of claim 1, further comprising at least one of: one or more common stereo DACs; a common audio interpolator block; and a common FM modulator unit.

19. The receiver of claim 1, wherein said partially shared TDM signal processing comprises fixing a correlation to the longer fast synchronization preamble of the two satellite services, storing two reference sequences in hardware and selecting a reference sequence based on which service is then active, and zero padding the shorter reference sequence to limit its contribution to the correlation output to only symbols of interest.

20. The receiver of claim 1, wherein said partially shared COFDM signal processing comprises using identical processing blocks to achieve all required synchronization.

21. A satellite radio receiver capable of receiving broadcasts from different satellite radio services, comprising:
- a common S-band antenna and analog tuner;
- a common A/D converter;
- partially shared TDM signal processing; and
- partially shared COFDM processing;
- wherein a common microprocessor is used to control tuner/baseband chip functionality and to perform audio decoding, and
- wherein said partially shared TDM signal processing comprises fixing a correlation to the longer fast synchronization preamble of the two satellite services, storing two reference sequences in hardware and selecting a reference sequence based on which service is then active, and zero padding the shorter reference sequence to limit its contribution to the correlation output to only symbols of interest.

22. The receiver of claim 21, wherein the two SDARS signals are those broadcast by Sirius Satellite Radio and XM Satellite Radio.

23. The receiver of claim 21, further comprising one of (i) a second S-band antenna and analog tuner, and (ii) a second S-band antenna and analog tuner, wherein the second S-band antenna and analog tuner can be utilized as an optional diversity path.

24. A satellite radio receiver capable of receiving broadcasts from different satellite radio services, comprising:
- a common S-band antenna and analog tuner;
- a common A/D converter;
- partially shared TDM signal processing; and
- partially shared COFDM processing; and
- four TDM demodulators, wherein all four are used for demodulating a TDM signal from a first SDARS transmission, and two of are used for demodulating a TDM signal from a second SDARS transmission,
- wherein a common microprocessor is used to control tuner/baseband chip functionality and to perform audio decoding.

25. The receiver of claim 24, wherein the second SDARS transmissions is a Sirius transmission, and two TDM demodulators can be used as a diversity receiver.

* * * * *